(12) United States Patent
Moravits (10) Patent No.: US 10,371,563 B2
(45) Date of Patent: Aug. 6, 2019

(54) PACKAGE INTAKE DEVICE SYSTEM AND METHOD FOR USING SAME

(71) Applicant: Jeffrey M Moravits, New Braunfels, TX (US)

(72) Inventor: Jeffrey M Moravits, New Braunfels, TX (US)

(*) Notice: Subject to any disclaimer, the term of this patent is extended or adjusted under 35 U.S.C. 154(b) by 0 days.

(21) Appl. No.: 15/212,007

(22) Filed: Aug. 2, 2016

(65) Prior Publication Data

US 2017/0191864 A1 Jul. 6, 2017

Related U.S. Application Data (60) Provisional application No. 62/274,474, filed on Jan. 4, 2016.

(51) Int. Cl.
*G01G 19/00* (2006.01)
*G01B 11/02* (2006.01)
*G06Q 50/28* (2012.01)

(52) U.S. Cl.
CPC ......... *G01G 19/005* (2013.01); *G01B 11/022* (2013.01); *G01G 19/002* (2013.01); *G06Q 50/28* (2013.01); *G01G 19/00* (2013.01)

(58) Field of Classification Search
CPC ...... G06Q 50/28; G01G 19/00; G01G 19/005; G01B 11/02; G01B 11/022

USPC .......................................................... 702/173
See application file for complete search history.

(56) References Cited

U.S. PATENT DOCUMENTS

| | | | | |
|---|---|---|---|---|
| 2007/0045011 | A1* | 3/2007 | Dittrich | G01G 19/58 177/148 |
| 2012/0271592 | A1* | 10/2012 | Harres | G01G 9/005 702/173 |
| 2012/0324067 | A1* | 12/2012 | Hari | G06F 13/385 709/222 |
| 2014/0211982 | A1* | 7/2014 | Murphy | G06Q 10/087 382/101 |

FOREIGN PATENT DOCUMENTS

WO    WO 2017/068552 A1 * 4/2017

* cited by examiner

*Primary Examiner* — Gregory J Toatley, Jr.
*Assistant Examiner* — Lynda Dinh
(74) *Attorney, Agent, or Firm* — Jackson Walker LLP (57) ABSTRACT

A UID is utilized as a scale and determine basic intake information for shipping a package in order for an individual to use their UID as a intake information determining device in sending packages. Such a device is intended to be used with unmanned kiosks where the intake information would be transmitted to the shipper and the package deposited for pickup and shipping. Unmanned kiosks of this nature would provide for reduced cost and ease of drop off of packages.

2 Claims, 10 Drawing Sheets

PACKAGE INTAKE DEVICE SYSTEM AND METHOD FOR USING SAME

CROSS REFERENCES TO RELATED APPLICATIONS

This application is based upon and claims priority from U.S. Provisional application Ser. No. 62/274,474, filed Jan. 4, 2016, which is incorporated herein by reference.

BACKGROUND OF THE INVENTION

Field of the Invention

Applicants' invention relates to a device generally in the fields of scales and mobile devices for weight and size determination, and method for using same. More particularly, it relates to a system of devices for automating package intake in preparation for shipping.

Background Information

Transporting a package from one place the world to another requires, or at least is optimized by, and efficient operation. This is critical, because a shipping company can transport literally millions of packages per day. In order to do so, modern shipping companies make use of three main modes of transport—road, air, and rail. And, they must have highly efficient sorting methods and tools that link to transport methods in order to move the volume of packages that they do.

In general, a package will have multiple "touch points" in which the package must be physically handled during the delivery process. "Touch points" generally occur during the loading and sorting phases of the delivery. Additionally, if a package is being sent by airmail, there are central hubs through which most packages are sent. At these hubs packages come in from multiple remote locations, are sorted, and go out to multiple remote locations.

During the shipping process, many patrons as well as the shipping company want to be able to track individual packages. This can confirm delivery as well as provide status updates for estimated times of delivery. From a customer service perspective this is one of the most important aspects of shipping. In order to get a status update, a special code with a tracking number is automatically scanned at each stage of transportation or sorting providing the tracking information. Plus, when looking at a tracking description the patron may see the package has been received at a specific office, transported to, another received there, sent out again, and the tracking goes on.

When a package is received at a local delivery point, there are often two or three sorting phases—each splitting packages into finer and finer geographic slices depending upon their destination.

The entire process is subject to the correct labeling of each individual package. The "intake" of a package requires the gathering of specific information for labeling such as: identity and address of the shipper, identity and address of the receiver, dimensions and weight of the package, shipping speed information, transport type information, tracking requirements, and other like data.

Package intake done at a shipping location by trained and experienced, shipping personnel easily provides the required intake information. However, to account for modern efficiencies as well as remote drop off locations where it is inconvenient or not cost effective to post trained personnel, there is a need for a device and method for doing package intake at remote, unmanned locations.

SUMMARY OF THE INVENTION

The present invention provides for a package, shipping intake device for use with a user interface device ("UID"). The present invention provides a novel apparatus that will interface with a user's UID in order to obtain intake information and mark a package that the user wishes to ship.

As used herein, UID is intended to be interpreted broadly and means a handheld device that may combine variations of data, computing, telephonic, facsimile, Internet, and networking features. A UID may also be referred to as, and can include, a mobile device, smart phone, tablet, hand-held computer, personal digital assistant, laptop, pocket computer, or the like. A typical UID often functions as a cellular phone, Web browser, data storage device, camera, audio player, video player, and personal organizer in addition to a host of other functions, such as applications both pre-installed and downloaded. To effect these functions, the UID can include a multiplicity of hardware components. In relation to the present invention, a UID can provide information specific to the user as well as calculation and determination of intake information for the package.

The present invention further provides for a "kiosk" to be provided, such that a user wanting to ship a package would bring the package and they are UID to the kiosk. The UID would be connected, either wired or wirelessly, to a control device in the kiosk and would assist in the intake of the package by helping determine addresses, size and weight dimensions, and shipping options desired by the user for the package. The package would then be marked or labeled such that sorting devices at shipping hubs would be able to recognize all of the necessary data associated with the package.

The important part of the kiosk is that they would not need to be manned with shipping personnel other than to pick up packages that have been left in a storage compartment in the kiosk. Thus, shipping companies could provide more points of shipping for users while not needing to provide trained personnel at those points. This could be advantageous in both metropolitan and rural areas.

DETAILED DESCRIPTION OF THE
PREFERRED EMBODIMENT

| 10 | Package Intake device |
| 20 | UID |
| 22 | Scale |
| 24 | Shipper Database |
| 26 | Internet |
| 28 | Shipper Processor or Controller |
| 30 | Communications Network |
| 32 | Security Device or Case |
| 34 | Communication connection |
| 36 | Label |
| 38 | Package |
| 40 | Printer |
| 42 | Pressure Sensor |
| 44 | Display |
| 46 | Intake Card |
| 48 | Density Sensor |
| 50 | Length Sensor |
| 52 | Camera |
| 54 | Speaker |
| 100 | Kiosk |

Figure 1:
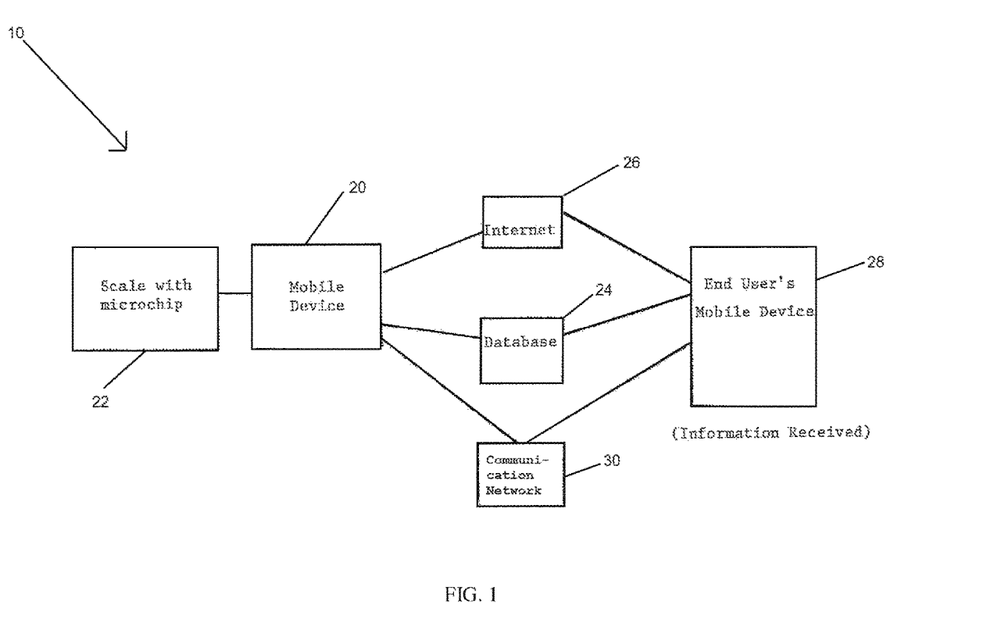
FIG. 1 is a schematic view illustrating a portion of the system of the present invention.

Referring to the figures, FIG. 1 is a general schematic of the present invention 10. Generally, at a kiosk/locker 100 a processor 28 and scale 22 are connected with the user's UID 20 and uplinked to a controller 28 and database 24 of the shipper. It is anticipated that the uplink will be via the Internet 26, however it could be via any communication network 30. The shipper, through its controller 28, can then send the user's UID 20 the intake information needed to print the label 36. The package 38 can be dropped off or left at the kiosk 100 for shipping. The kiosk 100 does not necessarily need to print an identification label 36, although that is possible.

It is anticipated that the device 20 or the user will have a personal identification number with the distributor either by its specific microchip and the information of the user's UID 20 or by allowing the user to set up an account through the UID 20. It is anticipated that when the UID 20 is in communication with the kiosk 100 processor 28 (such as in a security case 32, or connected with a scale 22), the shipper can identify the user during the connection through current identification technology of Internet 26 and Cloud applications.

Figure 2:
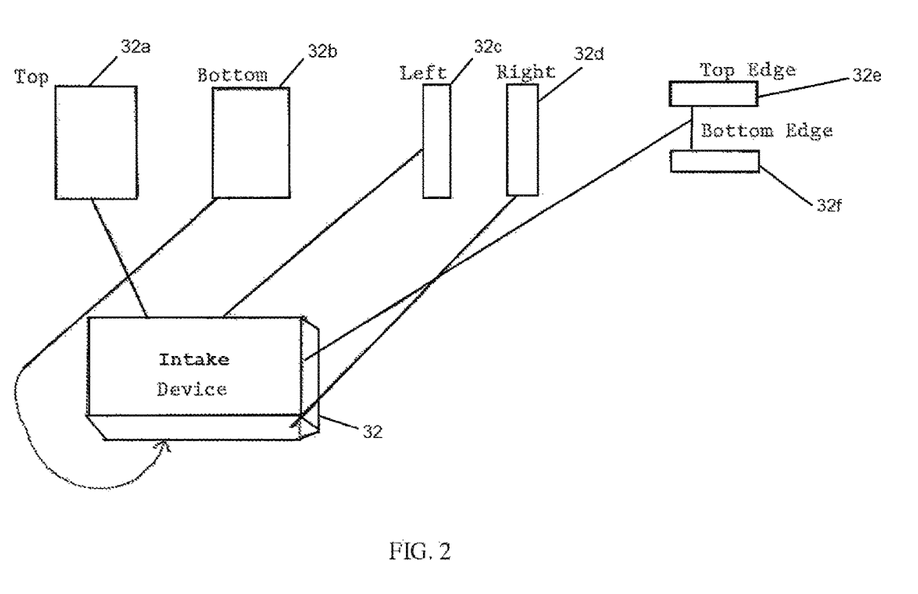
FIG. 2 is a schematic view illustrating a first embodiment of the intake device of the present invention.

FIG. 2 illustrates a first embodiment of the present invention 10. It is a schematic view of the intake device 32 of the present invention 10. This first embodiment includes a security case 32 that incorporates a scale 22 and UID covers 32 for determining weight and securing the UID 20. A scale 22 is used to weigh the package 38 and is not to be limited to a certain type of scale. In other words, in this embodiment, the scale 22/secure mobile device 32 is used to weigh the package or products 38. The intention of the device 32 is to enable the user to fit, slide, and or secure their UID 20 in the security case 32.

It is anticipated that the security case 32 will have a retention device friction, cover, strap or the like, such as cushion, foam, or rubber, to secure the UID 20 in place. The scale 22 will be on the surface of the secured case 32 while the base of the security case 32 will be used as the base plate for weighing objects/products 38. Within the security case 32, it is anticipated that there will be built in microchip or processor 28 which will enable the device 32 as a whole to be connected for electronic communication to the UID 20. This connection 34 may be wired or wireless. The security case 32 will secure the UID 20, weigh the package 38, and be able to communicate across an electronic network 30 such as the Internet 26 to the shipping company and so as to provide intake information as to the package 38. It is anticipated that the intake information could include information such as:

1. Weight
2. Destination
3. Location of sender
4. Cost
5. Billing Cycle
6. History/profile of User
7. History of account, package 38s sent, types of package 38s
8. Location of closest kiosk 100 or locker It is anticipated that a security device 32 for UID 20 could have six (6) usable sides: left 32c and right 32d sides, front 32e and back 32f sides generally, and top 32a and bottom 32b edges generally. Thus the security device 32 can enclose the UID 20. Within the security device 32 there will be a microchip or processor 28 that links case 32 to UID 20. The processor 28 enables the security case 32 to uplink information to the shipper.

The processor 28 gives the user and the shipper's database 24 the intake information of the package 38 to be shipped. The processor 28 can be used to scan the item 38 at the kiosk/locker 100 setup through the shipper's electronic communication 30 and database 24 system. At the kiosk/locker 100, the user will scan the package 38 and the processor 28 will allow the intake information to go directly to the shipper's database 24 by Internet 26, or software application. After being scanned, a printer 40 at the kiosk or locker 100 will then print out a label 36 to be adhered to the package 38.

Inside the security case 32, there can be a retention device that not only secures mobile device 20 but also helps protect it from damage if dropped.

The security case 32 effectively converts the UID 20 into a scale 22 that can weigh and determine package 38 intake information which can be provided to the user and the shipper for use in the delivery of the package 38. It also allows the user to scan the package 38 at the kiosk/locker 100 to receive a label 36 to place on the package 38 for delivery/tracking/billing, etc. In addition to the security case 32/scale 22/processor 28 and scanning ability, there is an option for a printer 40 that connects to the device 32 which enables the user to print out a label 36 to adhere to the package 38 that can be scanned by the shipper at its distribution centers.

One side, anticipated to be the top 32a, of the security case 32 a pressure plate or transducer 42 will be located, or connected to pressure sensors 42 making up the scale 22, for placement of the package 38 for weighing. The scale's 22 surface may encompass the entire surface area, or some portion thereof, of the top 32a of the security case 32 whereas the bottom 32b of security case 32 can decipher the information through the transduction of top plate 32a to and from bottom plate 32b. The intake information can be sent to and through the UID 20 from the security case's processor 28.

Figure 3:
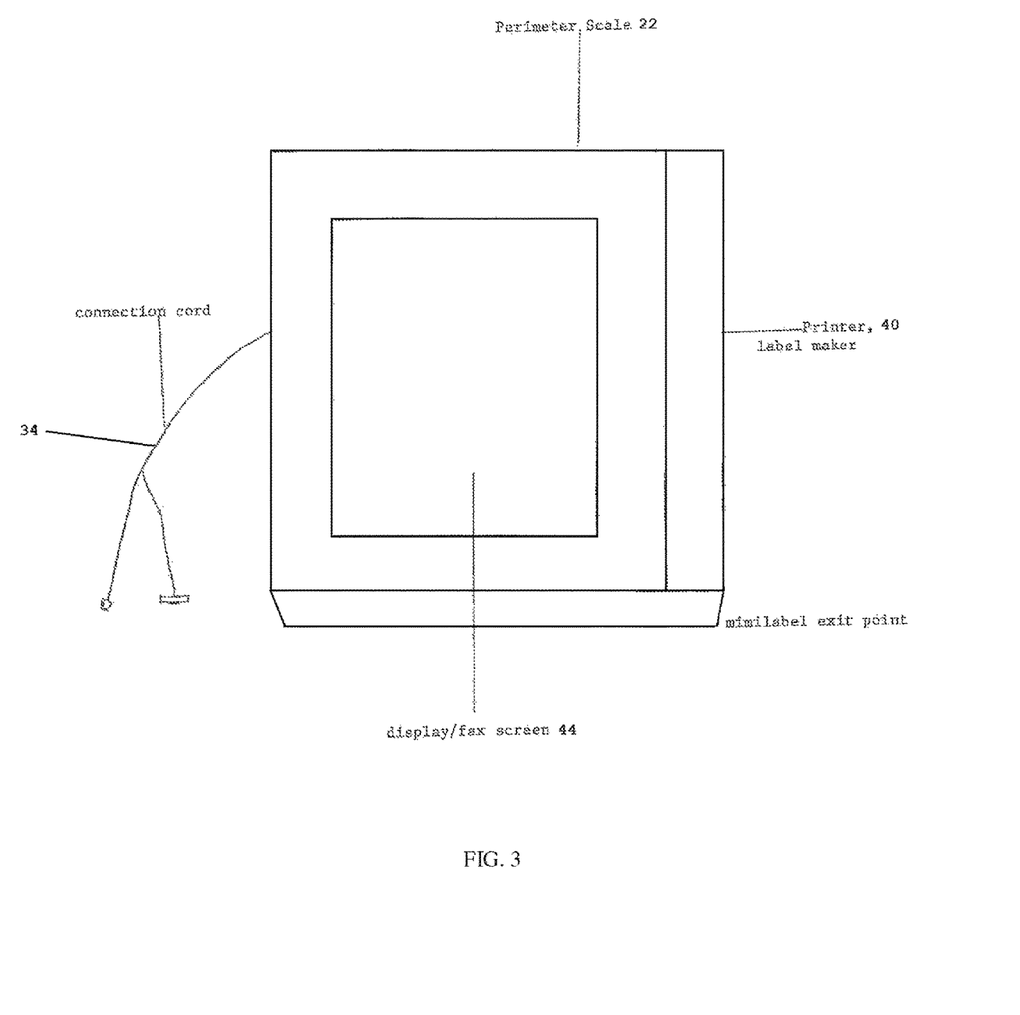
FIG. 3 is a schematic view illustrating a second embodiment of the intake device of the present invention.

FIG. 3 is a schematic view illustrating a second embodiment of the intake device 32 of the present invention. In this second embodiment, the intake device 32 is anticipated to include a display 44, printer 40, scale 22, and a connection means 34—either wired or wireless. The connection means 34 places the intake device 32 in electronic communication with the user's UID 20. The user would place their package 38 on the scale 22 and intake information would be retrieved by the intake device 32. It would use a scale 22 which may be used to weigh a variety of objects not to be limited by any product. The intake device 32 would weigh the package or product 38. The intake device 32 includes a software application providing for communication with the UID 20. Around the display 44 is likely to be a bezel or perimeter border which can incorporate a scale 22. The display screen 44 can act as a touch screen for the input and output display of the software application. On one side of the intake device 32 a micro printer 40 could be located which will print the shipping labels 36 for the package 38. The intake device 32 would weigh packages 38 or objects, then using the software application and processor 28 for microchip to uplink to the shipper's network or database 24, provide the shipper with the package's 38, and the user's, intake information.

It is anticipated that in this embodiment, the scale 22 could open like a book. The cover would open and the intake device 32 would be activated ready for use. This display/touch screen 44 could be multitasked to send facsimiles as well by having a camera software application installed on the processor 24 in the intake device 32.

In regard to the scale 22, the intake device 32 is anticipated to have a scale 22 covering a portion of the perimeter of at least one side of the display/touch screen 44. A printer 40 on another side could print labels 36 capable of being adhered to the package that is being weighed. With this scale 22, the user can put it into communication with any UID 20.

With the processor/microchip 28 and the software application installed, the intake device 32 can be identified by the UID 20 or the user can set up an account with the shipper. This allows the user to eliminate every outside step except to drop it off at a kiosk/locker 100.

Another option could be that the printer 40 can print micro labels 36 which can be scanned at the kiosk/locker 100 for tracking and delivery purposes. This intake device 32 and software application could keep the user's account information available for distribution or the user's future use. The intake device's 32 ability to send intake information, or portions of the intake information, to and from the user and the shipper would make the process less time-consuming. It allows the shipper to save time, money, and manpower because it eliminates so many steps of the pickup, tracking, and delivery process. It sends and receives intake information pertinent to, but not limited to, the purpose of sending and receiving the distribution of mail and packages 38 whether it be for an individual or a company.

This device can be invaluable to a subject of users trying to send and receive products 38 for the purposes of a growing a small business. The surface of the device 32 can be the pressure plate 42 area of the scale 22. The base of device 32 has processor/microchip 28 and has a software application installed to uplink to an account which is necessary for the user and the distributor. The information of package 38/costs/location, etc. can be interlinked with all three parts of the contact. (Mobile device, mobile scale/printer/scanner/camera, app account information with distributor, and location of kiosk/locker.) This device has the ability to scan any label sent from account to distributor that may be on but not limited to envelopes/packages/boxes or other packaging entities which can be mailed to user where the user places product/letter or information, not limited so the individual can place in distributor package the user weighs envelope/package.

Figure 4A:
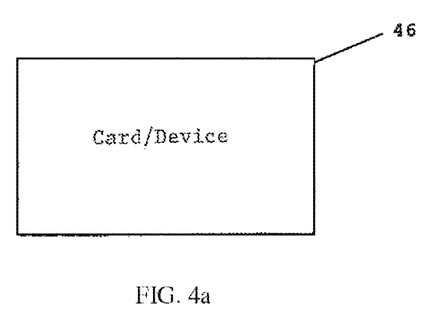
FIG. 4a is a schematic view illustrating a third embodiment of the intake device of the present invention.

FIG. 4a is a schematic view illustrating a third embodiment of the intake device 32, or intake card 46, of the present invention 10. In this embodiment, the intake card 46 is anticipated to be a small, thin card-shaped device. While such an intake card 46 is anticipated to be rectangular, it is not necessarily limited to any one shape. However, for the purpose of this design, the intake device 46 is described as a shape similar to an average credit card.

Figure 4B:
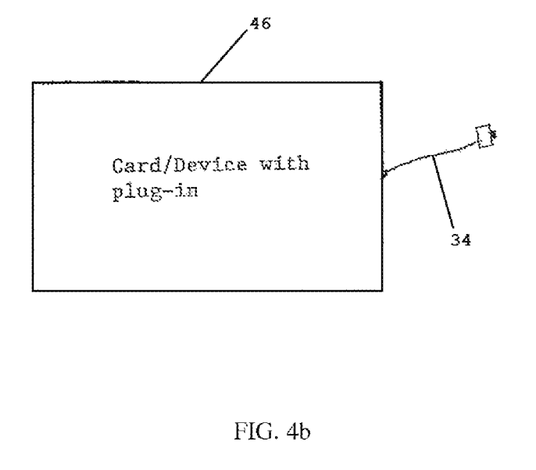
FIG. 4b is a schematic view illustrating a third embodiment of the intake device of the present invention.

FIG. 4b is a schematic view illustrating a third embodiment of the intake device 46 of the present invention 10. This card-shaped, intake device 46 will be perhaps be somewhat thicker than an average credit card in order to have enough volume to hold the required electronics inside the interior of the intake card 46, allowing for the intake card 46 to have a processor or microchip 28 that will enable the user to have the ability to link the card 46 into a UID 20 at the connection port in the UID 20 much like a pair of head phones or a credit card swipe device where the user plugs into the mobile phone 20 to use it like a credit card machine and billing device. The intake card 46 would have a communication connection 34 for connecting the intake card 46 to the user's UID 20. The communication connection 34 could be either wired or wireless, but would provide electronic communication between the intake card 46 and the UID 20.

Figure 5A:
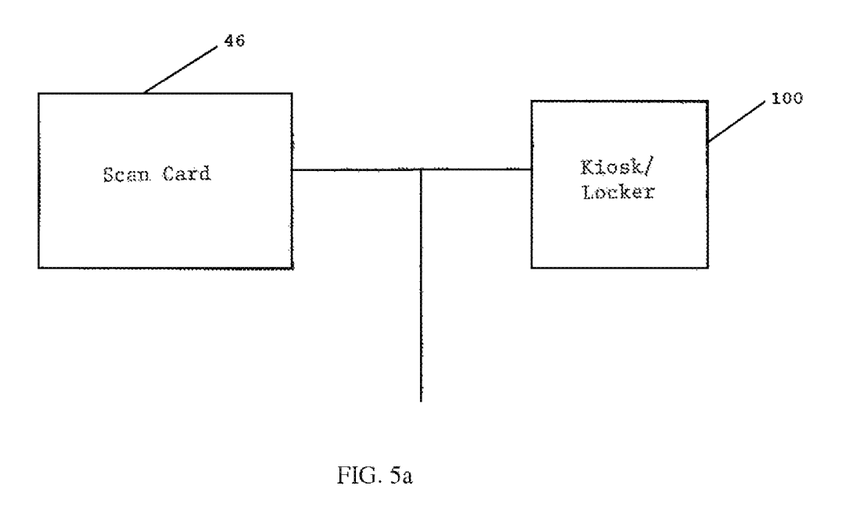
FIG. 5a is a schematic view illustrating a portion of the system of the present invention.

FIG. 5a is a schematic view illustrating a third embodiment of the system of the present invention 10. The package 38 is dropped off, and during intake, the user confirms information on the kiosk's 100 graphic user interface or GUI 44.

Figure 5B:
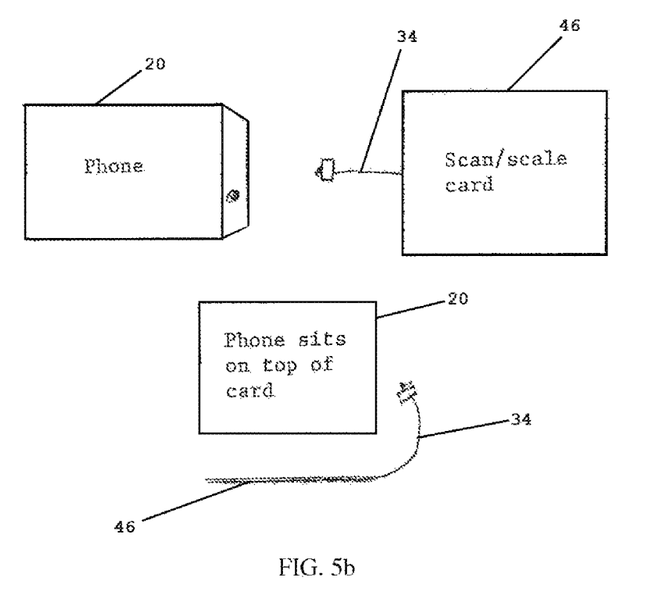
FIG. 5b is a schematic view illustrating a portion of the system of the present invention.

FIG. 5b is a schematic view illustrating a third embodiment of the system of the present invention 10. When the intake card 46 is plugged into (or in communication with) the UID 20, it activates a software application that enables the UID 20 to become a scale 22 that determines weight in pounds or kilograms by setting the mobile device 20 on the card 46. Once the card 46 is plugged into the UID 20, the intake card 46 uses information on the UID 20 in order to identify the user. Additionally, the intake card 46 would instruct the UID 20 to activate the shipper's software application. The shipping software application then prompts the user with simple questions at which time the user instructs or inputs on the UID 20 screen for the intake card 46 to weigh, select a package destination, select a package source location, at which kiosk/locker 100 the package 38 can be dropped off (based upon the relative nearness, as may be determined by GPS information, of nearby kiosks 100). The intake card 46 may also calculate billing rates, billing cycle, and where the user can be billed.

The user can then take the package 38 to a kiosk 100. At the kiosk 100, the user places the intake card 46 in communication with the shipper's network 30. This can be done via wired communication, wireless communication, scanning of the intake card, or other electronic communication. The shipper's software application determines the specifics of the transaction and the user may accept or reject the transaction. If accepted, the user leaves the package 38 at the kiosk/locker 100 to be picked up by the shipper for distribution.

It is anticipated that the intake card 46 may be designed so that it can be carried in a wallet or purse, and can be placed in electronic communication with any UID 20, whether the user owns the UID 20 or not. In this embodiment, any UID 20 may be used because the microchip 28 and the intake card 46 identifies the user, not the mobile device 20. The intake card 46 is not a scale 22; it is a device that serves as a scanning device and personal identification card. However, software on the intake card 46 can provide the ability for a UID 20 to act as a scale 22. With this measurement, the intake card 46 determines weight, cost, destination and billing and saves it in memory on the card 46. At the shipment hub, or kiosk 100, that same intake information can be transferred to the shipper. The card 46 can be plugged into any mobile device 20 for user to check their transactions, track packages 38, billing information, weight for the day, week, month, etc. although this is not necessarily it's full capabilities.

Figure 5C:
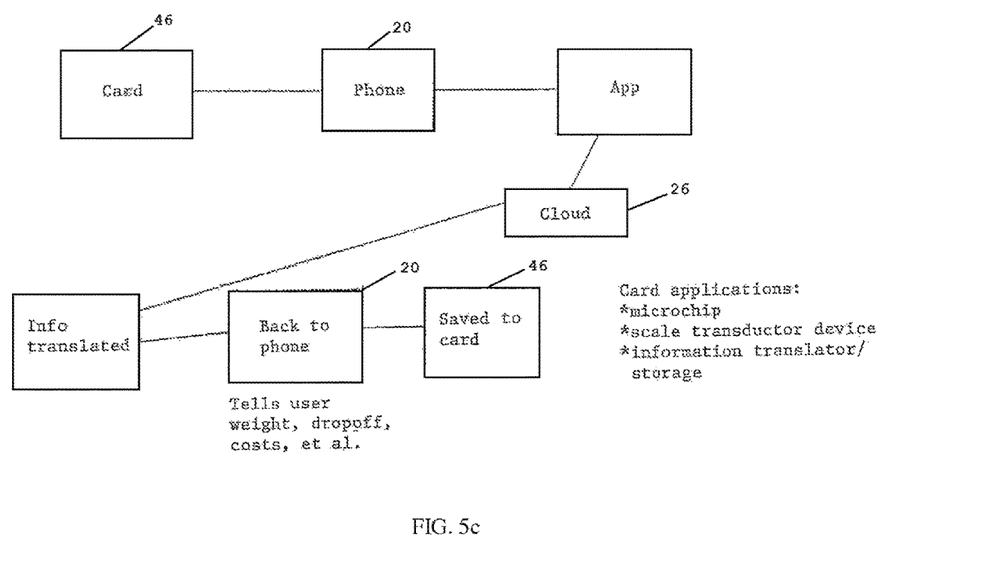
FIG. 5c is a schematic view illustrating a portion of the system of the present invention.

FIG. 5c is a schematic view illustrating a portion of the system of the present invention 10. The intake card's 46 processor or microchip 28 and digital magnetized scale transduction process that is installed in intake card 46 allows the UID 20 to become a surface for scale 22 usage. The intake card's 46 processor 28 and memory allows for saved information, personalized information, upload/download information to be communicated to a shipper's computer system via any mobile device 20.

The digital scale 22 can be implemented in a credit card size device 46 and can have a charge applicator that can be placed into communication with a UID 20. The scale application as illustrated on the figure can be uplinked to a UID 20 through electronic communication such as wire connection, wireless connection, but not limited to setting the UID 20 on the intake card 46. The scale 22 information can be deciphered through the UID 20 or microchip installed in the intake card 46. The purpose of the credit card size device 46 is not to show weight on a screen of its own but rather on the UID 20 with which it is in electronic communication. The microchip allows the intake card 46 to decipher and recognize information sent to the UID 20 such as: weight, where it is to be sent, where it is sent from, who is sending/receiving and billing information, but not limited to these capabilities.

The microchip is scanned at the kiosk 100 to identify the package 38 or anything that has been the subject of intake information, so that a printer 40 at the kiosk/locker 100 can print out an adhesive label 36 so the package 38 can be tracked and sent to correct location. It is anticipated that the intake card 46 would have a bar code, set of numbers and/or letters, name letters, name or other identifying code so that the user can set up an account with the shipping company.

While this device 46 can be the size of a credit card, it is not limited to the physical parameters of a generic credit card in size, shape, or thickness due to the multiple possibilities of the application. However, for easy usage and storage, the credit card size is advantageous because it can be stored easily in a wallet, purse, or other personal carry on. The intake card 46 case can be made of a number of materials, such as plastic, metal, rubber, or a combination thereof. Choice of a material would be based upon usage, durability and easy identifiable properties for the use of the item.

The processor or microchip 28 is used to scan the intake card 46 at the kiosk 100 in order to obtain the intake information regarding the item 38 being shipped. This can include general information that can be saved along with the billing information. The digital scale 22 can have any item set on it to be weighed. For example, the UID 20 can set on top of digital scale 22 to weigh item 38. The digital scale 22 can weigh item 38 individually while on a flat surface, it can have a platform set on it deciphering that weight while allowing large items that may not fit on the rectangular/credit card sized device 46 to be weighed.

The digital scale 22 can be plugged into UID 20, or a battery could be used but not limited to these ways for device 46 to stay charged and usable. The intake card 46 is anticipated to be rectangular/credit card size, but not limited to that shape, with identification number/letters/symbols for personal identity. The scale 22 as depicted in the figure, along with the microchip, give some artificial intelligence to set billing information weight, place sent, place for delivery, and tracking etc., but not limited to these items so the user can receive a billing statement. The digital scale 22 can be made of plastic, rubber, glass, metal or a combination, but not limited by these substances for durability and identification purposes.

Figure 6:
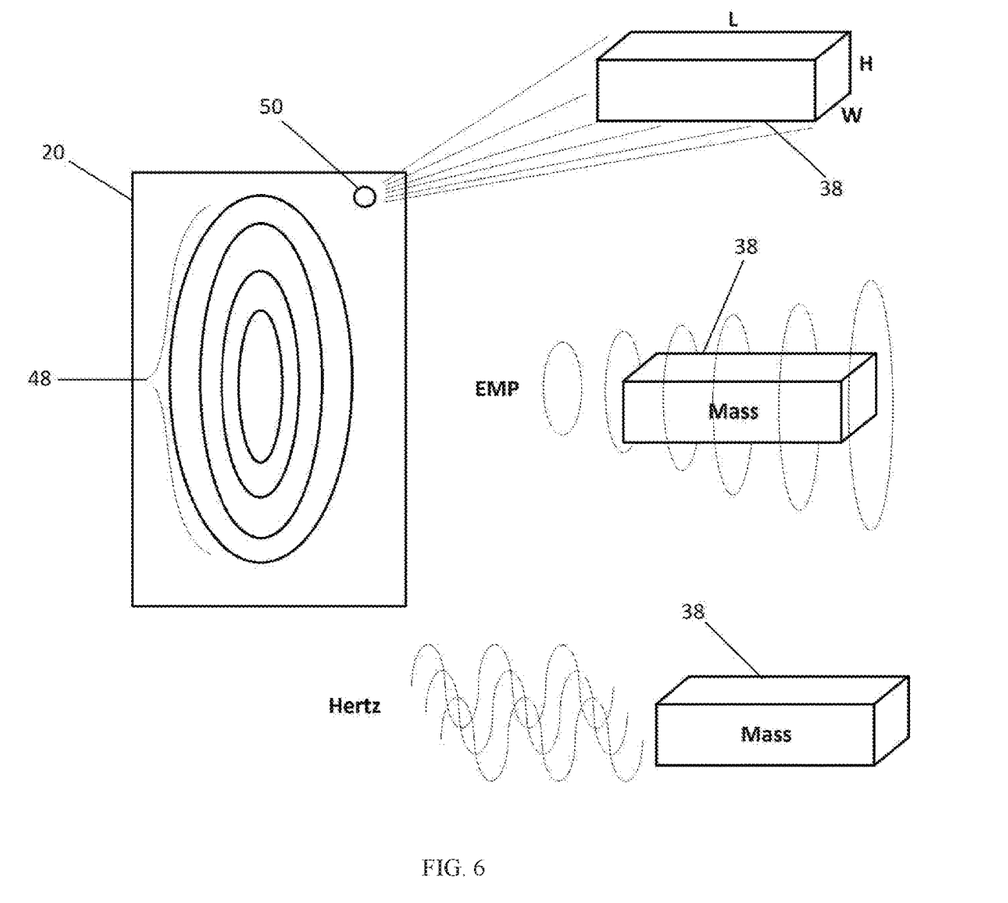
FIG. 6 is a schematic view illustrating potential embodiments for size and mass determination of the present invention.

FIG. 6 illustrates an alternative embodiment of the present invention. In this embodiment, the UID 20 may complete its intended use using an alternative set of components. In this embodiment, the scale 22 functionality is substituted for by density 48 and distance 50 calculators. The determination of the size of a package 38 for shipment includes size (or volume) and weight. These can be calculated by determining, or estimating, the dimensions of the package 38 and its density.

This alternative embodiment therefore, has a UID 20 that is equipped with a length sensor 50 and a density sensor 48. It is anticipated that the distance sensor 50 and the density sensor 48 can either take advantage of built in components of the UID 20 such as the camera 52 or speaker 54, or the sensor could be separate from the UID 20 but connected or in communication with the UID 20.

The length sensor 50 can use the on-board camera 52 or other measuring sensor of the UID 20 to determine the unknown dimensions of the package 38. There are many methods for determining length that are known, such as, but not limited to, using an optical sensor with a reference or using mathematical calculations, or laser distance measuring device. Software loaded in the UID 20 estimates the volume of the package 38 based upon the length sensor 50 measurements of the package 38 dimensions. Thus, for a regular, rectangular shaped package 38 the dimensions of length (L), width (W), and height (H) can be measured and the volume (V) determined using the formula V=L×W×H. Shape recognition software would enable the invention 10 to distinguish differently shaped packages 38 and the appropriate mathematical formula applied using the measured dimensions. As another example, a cylindrically shaped package 38 would have its height and diameter (d) measured and its volume calculated via the formula V=π(½d)²×H. For irregularly shape packages 38, the general shape may be recognized and the three (3) lengths in each of the X, Y, and Z axes estimated using the maximum lengths in the corresponding axes of the package, thus estimating the shipping volume of the package 38.

An average density of the package 38 as measured by the density sensor 48 would be determined. The density requires a choice of assumptions. It is unlikely that a package would be of uniform density throughout. Therefore, the density sensor 48 is likely to read multiple densities due to multiple materials in the package 38, and the average density would be calculated taking all of the individual densities into account. Additionally, if the density sensor 48 measures density along a line, or through a portion of the package 38, rather than over the entire volume, the average density of the volume would need to be estimated using some number of readings at varying locations of the package 38. The number and locations of the readings would be up to the user and/or the carrier. Options for density sensors 48 could include, without limitation, emitting a sound pulse at a given hertz or an electro-magnetic pulse. If a sound pulse is used, a range of frequencies, or a selected frequency, could be used in order to measure the time it takes to reflect the sound pulse which would give the user an average density measurement. Likewise, once the dimensions and average density (here, average density is the average density throughout the package 38) are determined or estimated, the equation for determining mass from average density and volume—Mass=Density/Volume (m=ρ/V) can be used. Mass may be expressed in kilograms, while density is expressed in units of kilograms per cubic meter, and volume is expressed in units of cubic meters. (Each of the units may be expressed in related units. e.g. Grams instead of kilograms.)

However, package 38 shipment usually deals in weight rather than mass. Mass is the amount of matter in an object no matter where it is, while weight factors the effect of gravity applied to the mass of the object. Weight is expressed in Newtons (N). Newton's second law is used to convert between weight (force) and mass: The equation for force is F=ma (force=mass×acceleration). Where, F is the force acting on the object as affected by gravity (i.e. the weight), m is the mass of the object in question, and a is the acceleration due to gravity (on Earth a is approximately 9.8 m/s$^2$ or 32.2 ft/s$^2$). In this context the same equation is often written as W=mg, with W standing for weight, and g for the acceleration due to gravity.

Combining these equations, we can see that if volume and density are known (or determined), then weight can be calculated.

$m = \rho/V$ and $V = L \times W \times H$ and $W = mg$; so $W = \rho \times 9.8/(L \times W \times H)$ Again, the equation for volume may need to be substituted for an appropriate equation if a non-rectangular package 38 is being sent.

Effectively, the density of the package 38 is divided by the volume of the package 38 to determine the mass of the package 38. That mass is then multiplied by 9.8 (or whatever the acceleration due to gravity is at the location of the package 38) to determine the weight.

Figure 7:
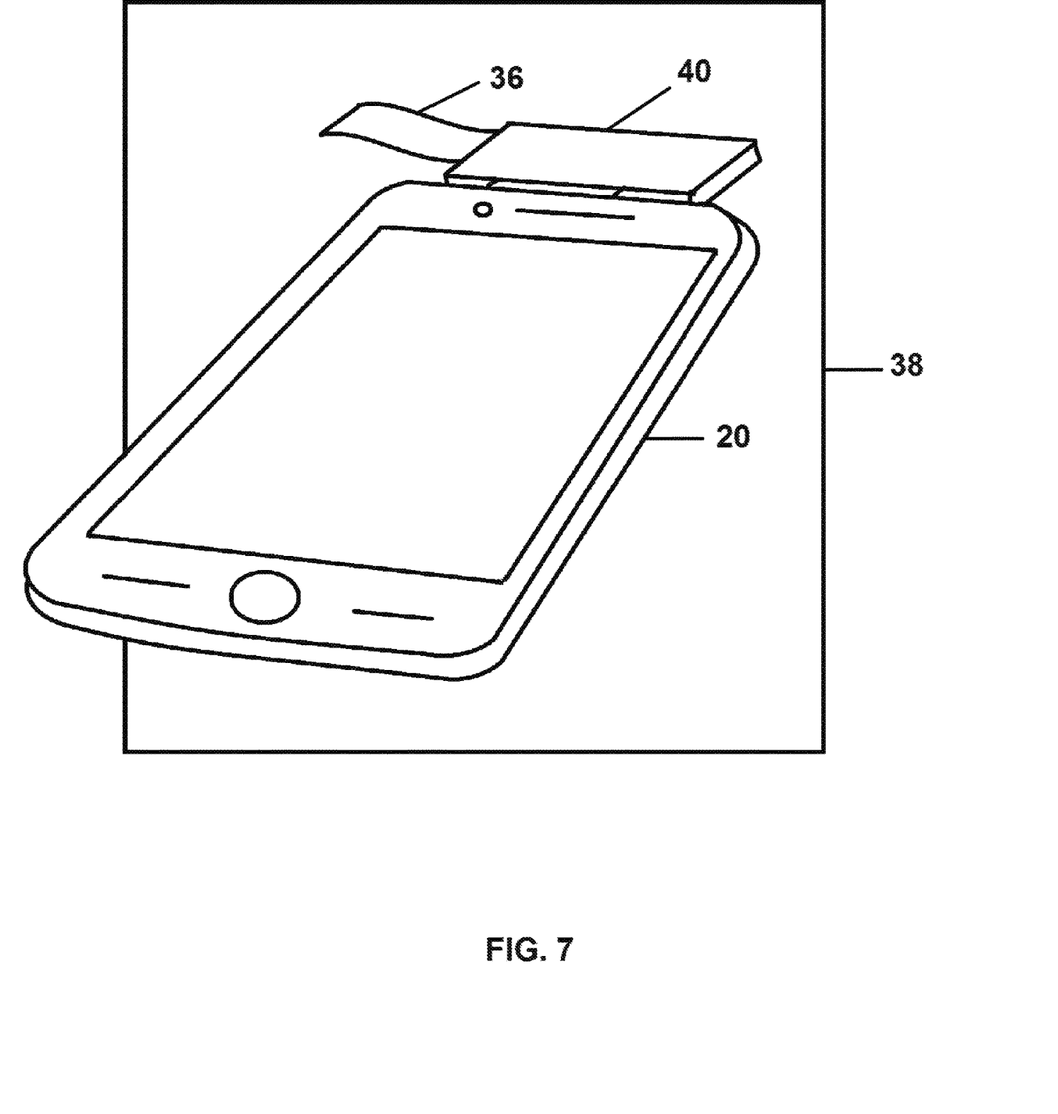
FIG. 7 is a schematic view illustrating the present invention with a label printer attached.

FIG. 7 illustrates the application of a shipping code by the UID 20 to the package 38, readying it for shipment. In one embodiment, the UID 20 is used to apply a machine readable marking to the package 38 or label 36 that can be affixed to the package 38. Multiple bits of information can be included on the marking, such as dimensions and weight, as well as shipper, receiver identification and addresses. The shipper can provide labels 36 identifiable by the shipper that are specific to the user. It is anticipated that the labels 36 would also include tracking information allowing the user to follow the shipment of the package 38 using the UID 20. Marking the label 36 or package 38 may be done using the UID 20 and an attached or integrated printer 40. The label 36 could include non-visible coding, such as infra-red or ultra-violet, that can be up-linked to the shipper's distribution center as well as identified and read by the shipper in order to help ensure authenticity and reducing fraud by third parties, and could be reusable. The code would let the receiver know that the package 38 is on the way and identifies a verified source of the package as well as additional shipment information.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

I claim:

1. An apparatus for determining the dimensions and weight of a package comprising:
    a user interface device, wherein said user interface device is handheld and functions as a telephone and also functions as at least one of a data storage device, a computing device, an Internet browsing device, an audio player, or a video player;
    a camera integrated into said user interface device;
    wherein said camera is in operative communication with said user interface device;
    wherein said camera is adapted to act as a dimension sensor; and
    wherein said user interface device is adapted to receive readings from said dimension sensor to determine dimensions of said package;
    a speaker integrated into said user interface device;
    wherein said speaker is in operative communication with said user interface device;
    wherein said speaker is adapted to act as a density sensor;
    wherein said density sensor uses at least one of a sound pulse or an electro-magnetic pulse to determine a density of said package;
    wherein said user interface device uses said determined dimensions of said package and said determined density of said package to calculate mass or weight.

2. The apparatus of claim 1, further comprising:
    an information transfer device in operative communication with said user interface device; and
    wherein said information transfer device causes machine readable communications to be associated with said package.

* * * * *